United States Patent
Wargin et al.

(10) Patent No.: US 6,789,835 B2
(45) Date of Patent: Sep. 14, 2004

(54) MOTORCYCLE WINDSHIELD ASSEMBLY

(75) Inventors: Thomas R. Wargin, Menomonee Falls, WI (US); Stephen L. Galbraith, Cedarburg, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 20 days.

(21) Appl. No.: 09/903,427

(22) Filed: Jul. 11, 2001

(65) Prior Publication Data

US 2003/0011166 A1 Jan. 16, 2003

(51) Int. Cl.⁷ .................................................. B62J 23/00
(52) U.S. Cl. ..................................................... 296/78.1
(58) Field of Search ........................ 296/146.1, 146.16, 296/84.1, 91, 96.21, 78.1; 280/219

(56) References Cited

U.S. PATENT DOCUMENTS

| | | | |
|---|---|---|---|
| 2,903,297 A | | 9/1959 | Zbikowski |
| 4,022,487 A | * | 5/1977 | Leahy ........................ 296/78.1 |
| 4,082,345 A | * | 4/1978 | Willey ....................... 296/78.1 |
| 4,166,650 A | * | 9/1979 | Saunders, IV ............. 296/78.1 |
| 4,226,463 A | | 10/1980 | Gager |
| 4,379,584 A | * | 4/1983 | Willey ....................... 296/78.1 |
| 4,489,973 A | * | 12/1984 | Willey ....................... 296/78.1 |
| 4,615,556 A | | 10/1986 | Stahel |
| 5,658,035 A | | 8/1997 | Armstrong |
| 5,855,404 A | * | 1/1999 | Saunders ................. 296/180.1 |
| 6,176,538 B1 | * | 1/2001 | Lawson et al. ............ 296/78.1 |
| 6,234,554 B1 | * | 5/2001 | Willey ....................... 285/319 |
| 6,293,606 B1 | * | 9/2001 | Jarosz et al. .............. 296/78.1 |

FOREIGN PATENT DOCUMENTS

| | | |
|---|---|---|
| EP | 0 060 807 | 9/1982 |
| GB | 827330 | 2/1960 |

* cited by examiner

Primary Examiner—Lesley D. Morris
Assistant Examiner—Paul Royal, Jr.
(74) Attorney, Agent, or Firm—Michael Best & Friedrich LLP

(57) ABSTRACT

A windshield assembly for use on a motorcycle includes a lower windshield mount fastened to the triple tree of the motorcycle. A windshield is pivotally mounted to lower windshield mount. A break-away mechanism is mounted to an upper portion of the windshield and releasably couples the windshield to an arm that is directly coupled to the handlebars of the motorcycle. If a predetermined force is applied to the windshield the break-away mechanism will release the windshield from the arm allowing the windshield to pivot.

47 Claims, 6 Drawing Sheets

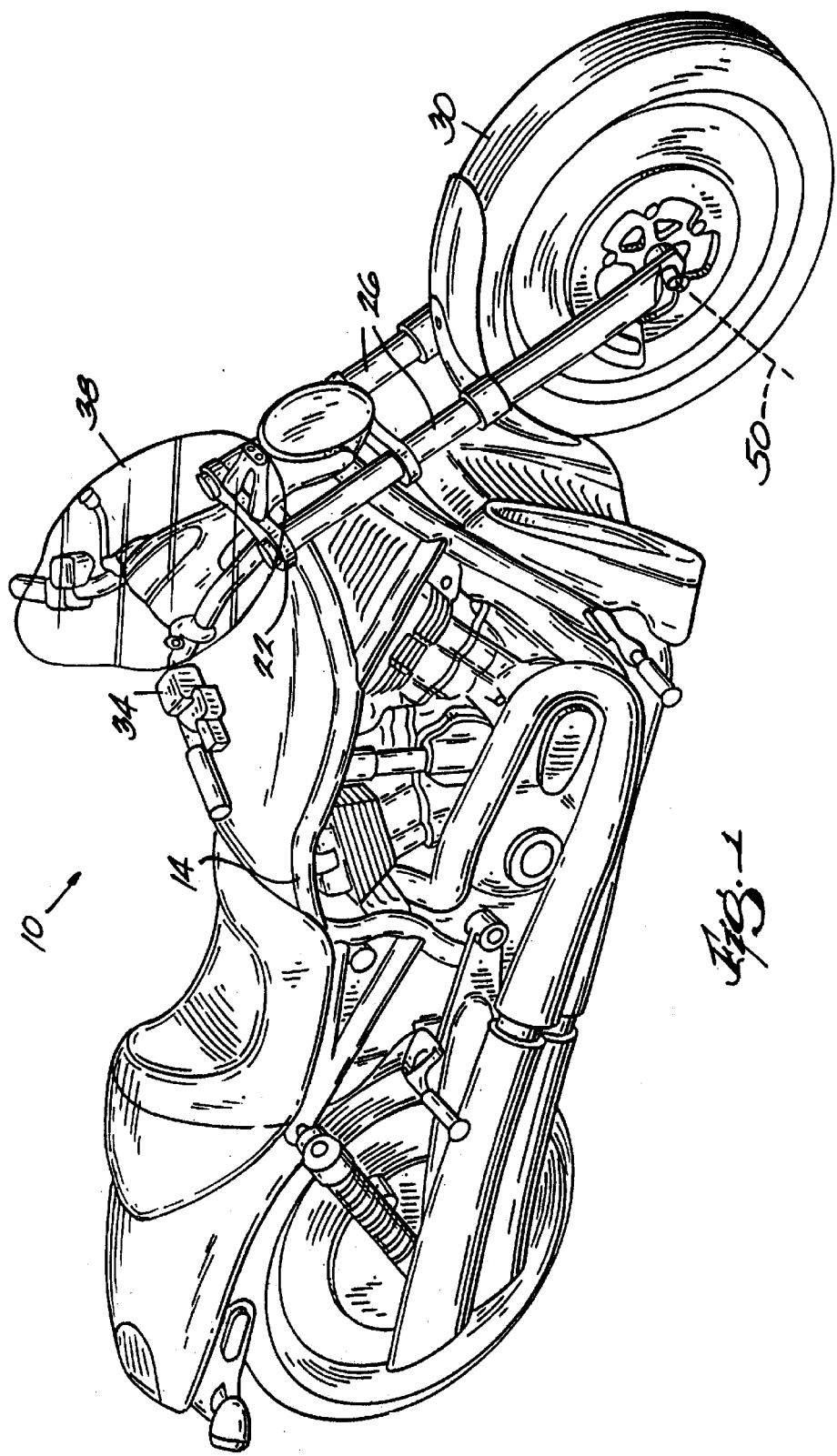

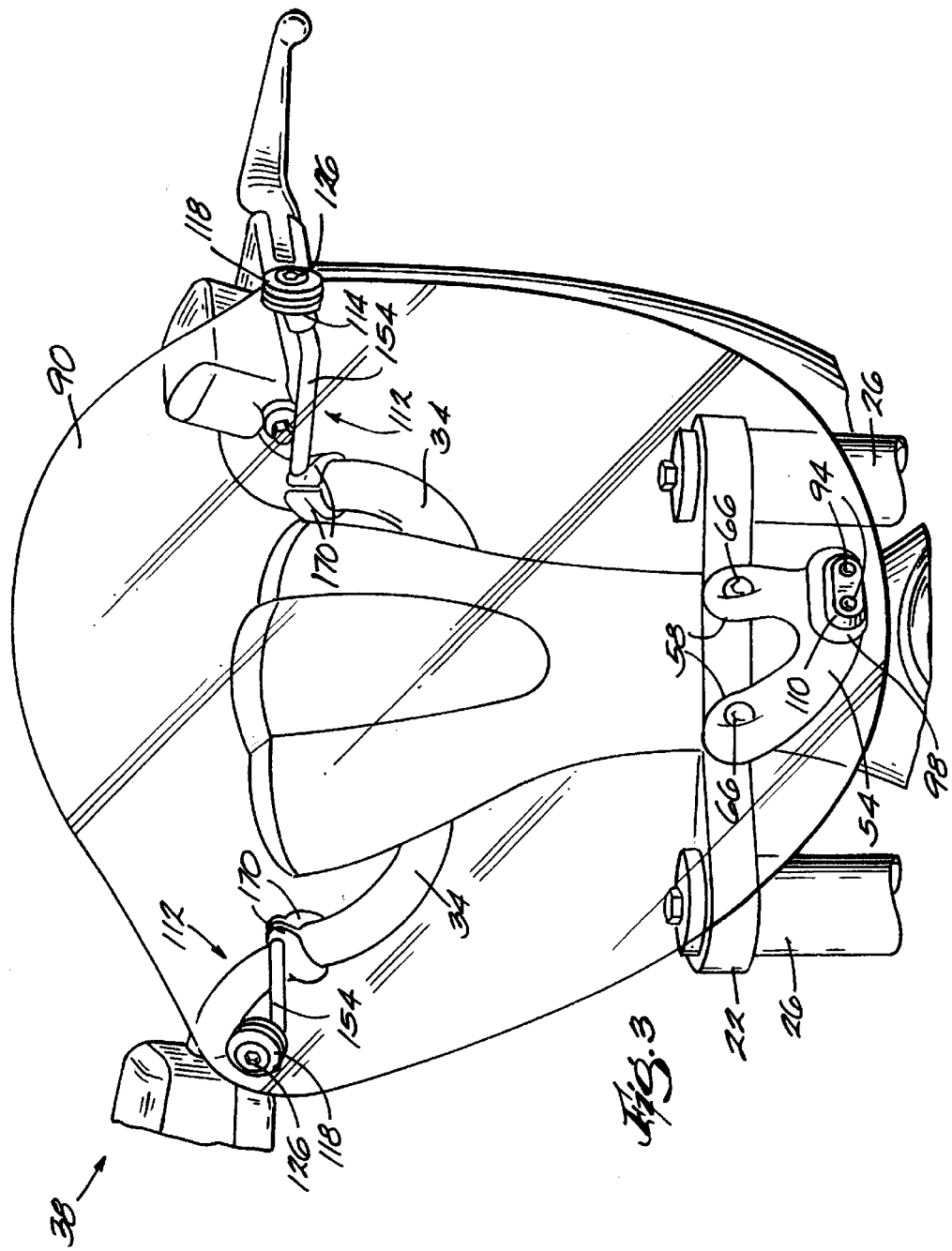

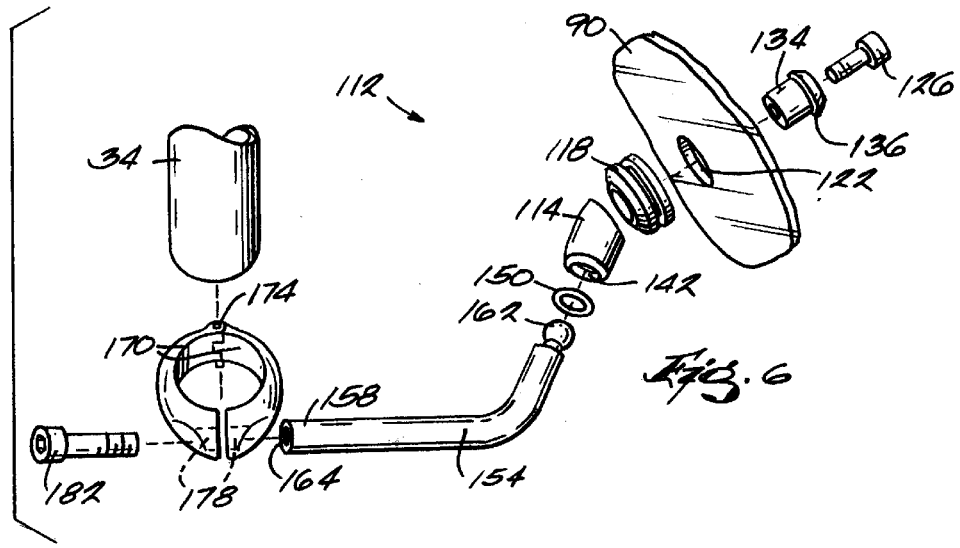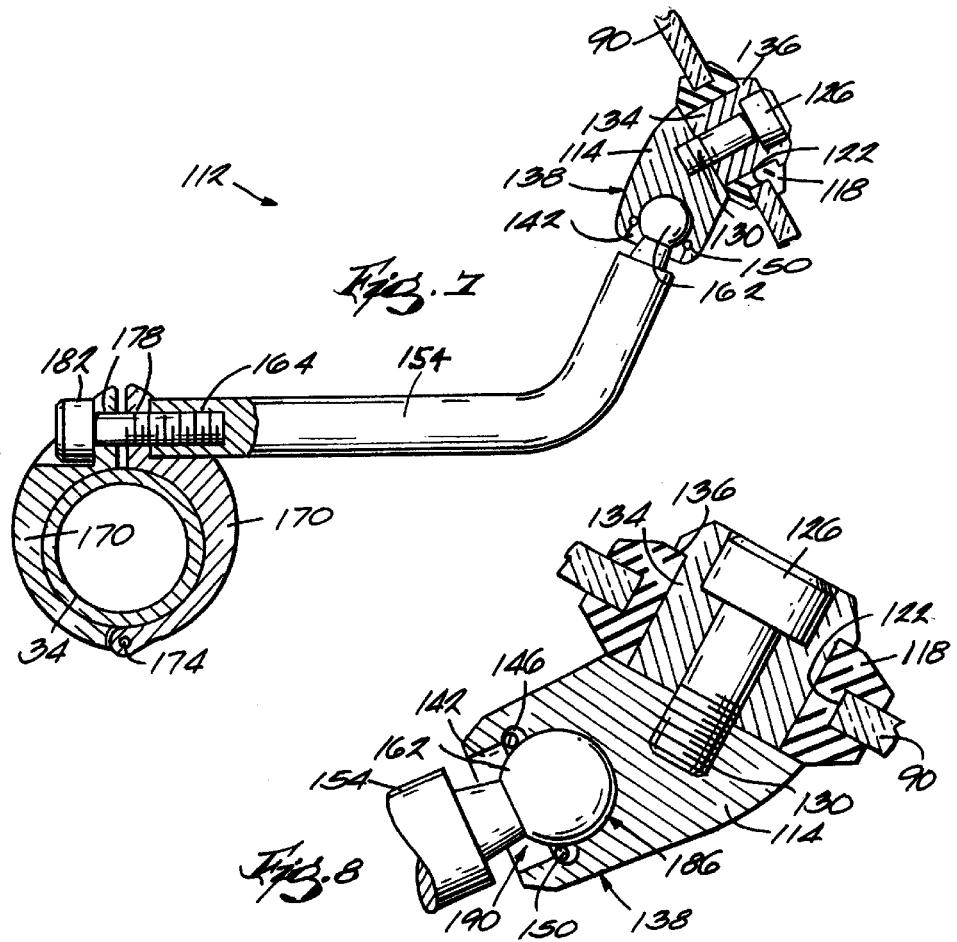

MOTORCYCLE WINDSHIELD ASSEMBLY

BACKGROUND OF THE INVENTION

The invention relates to motorcycle windshields.

SUMMARY

The present invention provides a windshield assembly for use on a motorcycle. The windshield assembly has a single lower windshield mounting member with a mounting portion and a pivot portion. The mounting portion is supported by the triple tree of the motorcycle, and the pivot portion has single a pivot pin. A windshield is pivotally mounted to the pivot pin. A break-away mechanism releasably couples the windshield to the handlebars of the motorcycle. In response to a predetermined force being applied to the windshield, the break-away mechanism permits the windshield to pivot about the pivot pin.

The mounting member may be generally V-shaped and is preferably directly mounted to the triple tree. The pivot portion may include a pivot boss fixed to the mounting member such that the pivot boss supports the single pivot pin. A lower windshield boss may be pivotally coupled to the pivot pin, and the windshield is preferably resiliently coupled to the lower windshield boss.

The break-away mechanism preferably includes a boss mounted to the windshield, and an arm with a first end fixed to the handlebars and a second end releasably coupled to the boss. The boss may include a threaded bore and the windshield may include a through hole. A resilient grommet may be positioned within the through hole in the windshield, and a windshield mounting fastener may be extended through the through hole and the grommet, and may be threaded into the threaded bore to fasten the windshield to the boss.

Either the boss or the second end of the arm may include a socket portion, and the other of the boss or the second end may include a ball portion. The socket portion preferably includes a resilient member (e.g. a split-ring spring clip) releasably securing the ball portion within the socket portion. The first end of the arm is preferably clamped to the handlebars of the motorcycle with a clamping assembly.

Other features and advantages of the invention will become apparent to those skilled in the art upon review of the following detailed description, claims, and drawings.

BRIEF DESCRIPTION OF THE DRAWINGS

FIG. 3 is an enlarged perspective view of the windshield assembly.

FIG. 4 is an enlarged top view of the lower windshield mount area.

FIG. 6 is an enlarged exploded view of the mounting arm area.

FIG. 7 is an enlarged section view of the mounting arm area.

FIG. 8 is an enlarged section view of the break-away mechanism.

Figure 2:
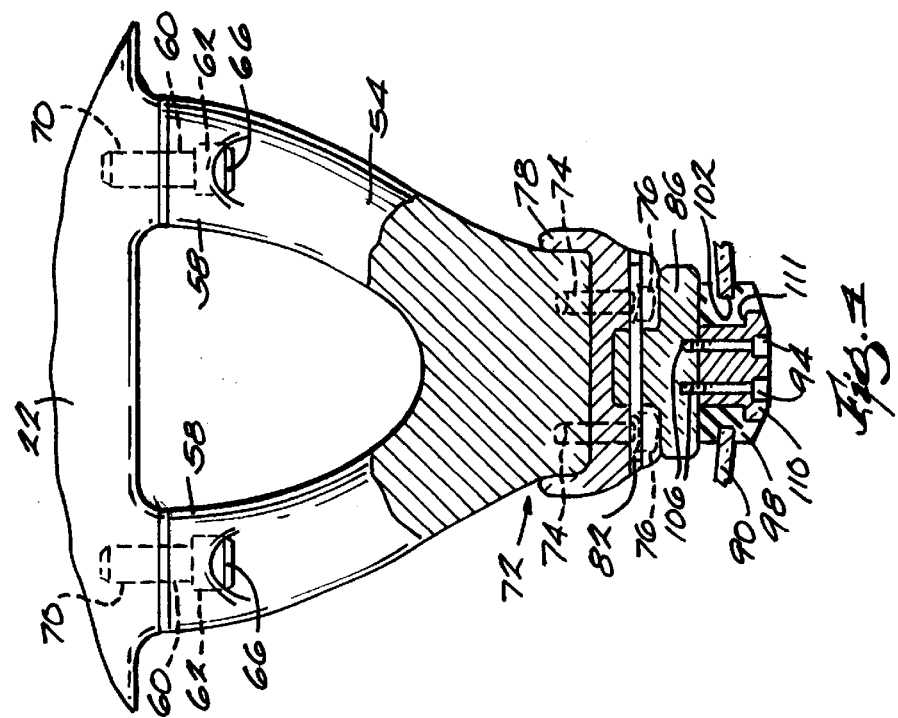
FIG. 2 is an enlarged view partially in section showing the steering area of the motorcycle illustrated in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
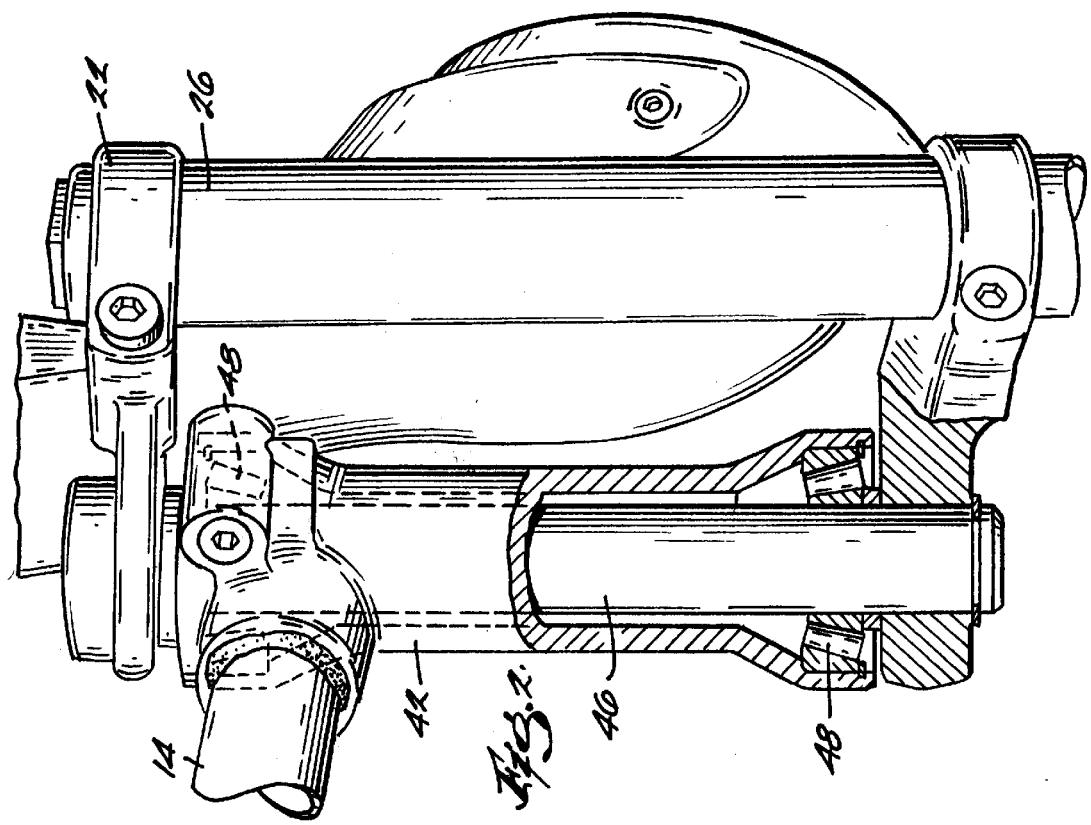
FIG. 1 is a front perspective view of a motorcycle with a windshield assembly embodying the current invention.

FIGS. 1 and 2 illustrate a motorcycle 10 including a frame 14, a triple tree 22, a pair of fork members 26 mounted to the triple tree, a front wheel 30, a handlebar assembly 34, and a windshield assembly 38. The frame 14 includes a steering tube 42 and the triple tree 22 includes a steering column 46 pivotally received within the steering tube 42 by bearings 48. The fork members 26 extend down from the triple tree 22 and the front wheel 30 is rotatably coupled between the fork members 26 for rotation about an axis 50. The handlebar assembly 34 is mounted to the triple tree 22 and is actuable to pivot the triple tree 22, steering column 46, fork members 26, and front wheel 30 with respect to the frame 14 to steer the motorcycle 10.

Figure 5:
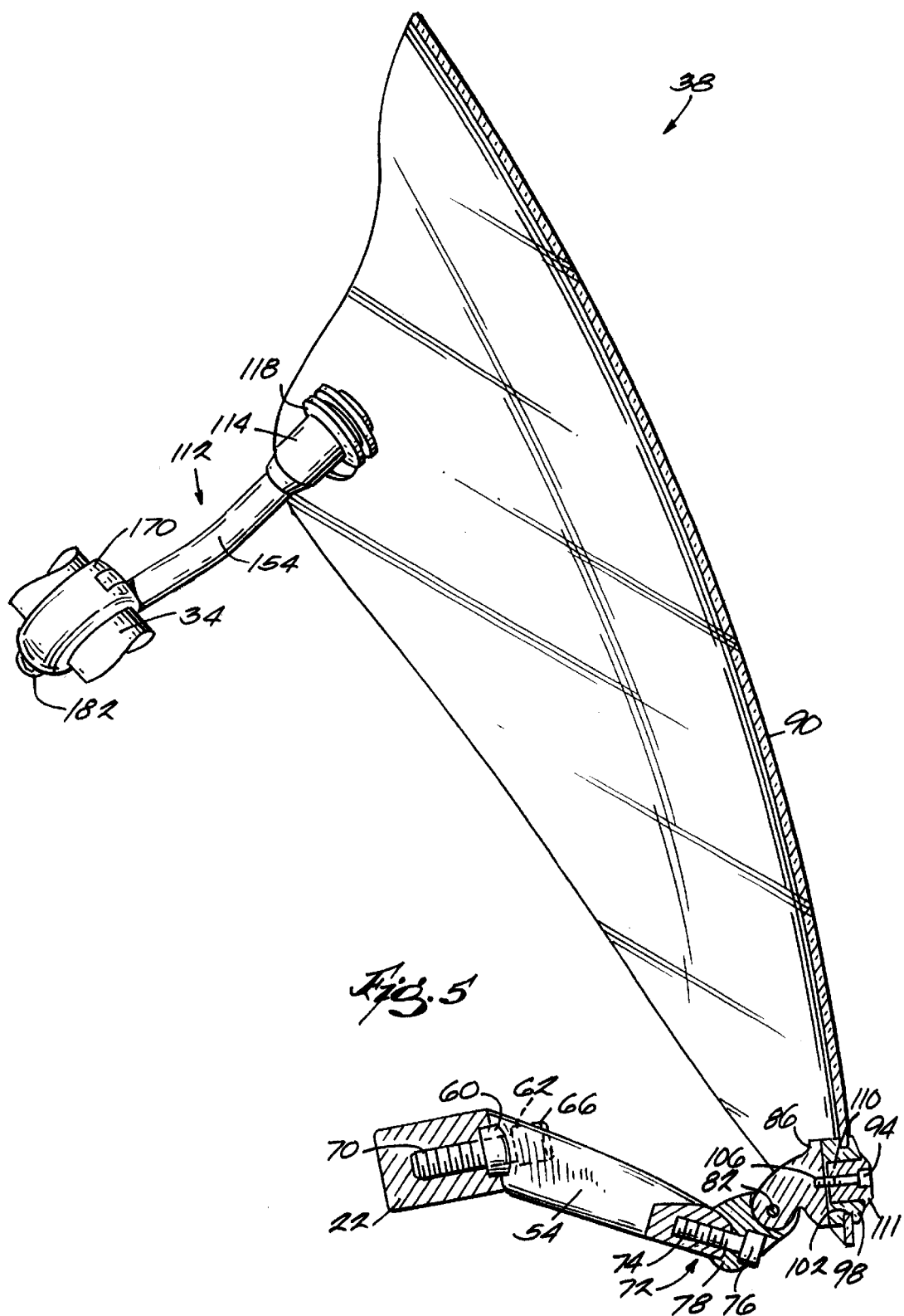
FIG. 5 is a section view of the windshield assembly.

Referring now to FIGS. 3–5, the windshield assembly 38 includes a generally V-shaped lower windshield mounting member 54. The mounting member 54 includes a mounting portion in the form of opposite legs 58. Each leg 58 defines a through hole 60 having a counter bore 62. A fastener 66 is extended through each leg 58 and engages a threaded hole 70 in the triple tree 22. Because of the counter bores 62, a majority of the head portion of each fastener 66 is surrounded by the leg 58 of the mounting member 54 and is substantially hidden from view. The mounting member 54 also includes a pivot portion 72 defining a pair of threaded blind holes 74. A fastener 76 is threaded into each hole 74 and mounts a pivot boss 78 to the pivot portion 72 of the mounting member 54.

The pivot boss 78 includes a pivot pin 82 having a longitudinal axis substantially parallel to the axis 50. A lower windshield boss 86 is pivotally coupled to the pivot boss 78 by the pivot pin 82. A windshield 90 is coupled to the lower windshield boss 86 by fasteners 94 extending through a resilient grommet 98 positioned in a through hole 102 of the windshield 90. The fasteners 94 are threaded into threaded bores 106 defined in the lower windshield boss 86. A rigid insert 110 including a lip 111 occupies the annular space between the fasteners 94 and the grommet 98 to retain and prevent deformation of the grommet 98 when the fasteners 94 are tightened. The resilient grommet 98 reduces the likelihood of windshield cracking by reducing the development of highly concentrated stresses around the perimeter of the through hole 102 (e.g. due to wind buffeting the windshield 90 or due to misalignment of the windshield 90 and mounting member 54). Thus, the windshield 90 is pivotally coupled to the triple tree 22 of the motorcycle 10.

Referring now to FIGS. 3–8, the windshield assembly 38 includes upper support assemblies 112 (illustrated most completely in FIGS. 6 and 7). The upper support assemblies 112 are generally associated with right and left sides of the motorcycle 10 and are substantially identical, thus only one of the upper support assemblies 112 is described below.

The upper support assembly 112 includes an upper windshield boss 114. The windshield 90 is coupled to the upper windshield boss 114 in a similar manner as that described above for the lower windshield boss 86 and includes a grommet 118 positioned in a through hole 122 of the windshield 90. A fastener 126 is passed through the grommet 118 and threaded into a threaded bore 130 of the upper windshield boss 114. A rigid tubular insert 134 including a lip 136 is used to retain and prevent deformation of the grommet 118 when the fastener 126 is tightened.

Figure 9:
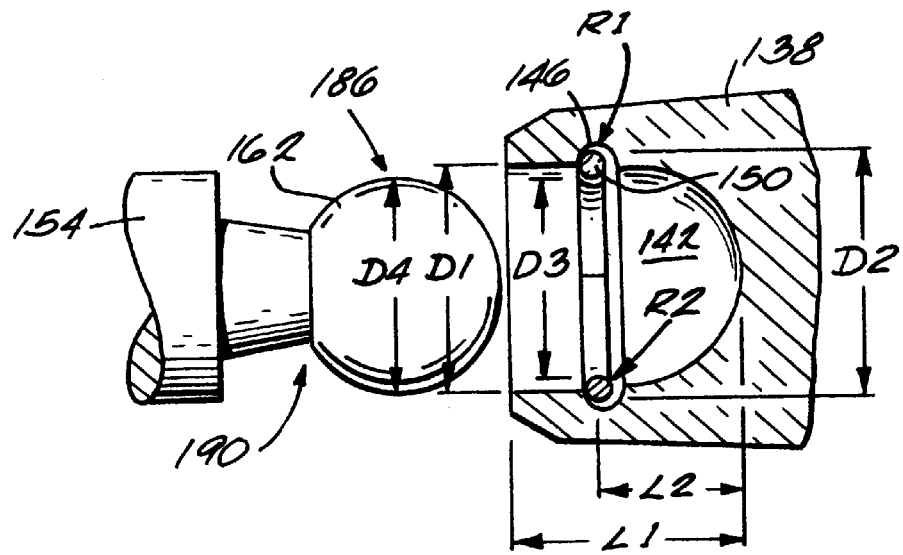
FIG. 9 is an enlarged view of the break-away mechanism with the mounting arm withdrawn from the cavity.

Referring now also to FIG. 9, The upper windshield boss 114 includes a portion 138 extending rearwardly from the windshield 90 and defining a substantially cylindrical cavity 142 therein. The cavity 142 includes a substantially frusto-spherical terminal end, and has a length L1 and a diameter D1. A circumferential groove 146 extends around the circumference of the cavity 142 and is located a distance L2 from the terminal end. The circumferential groove 146 has a substantially semi-circular cross-section having a first radius R1.

The upper support assembly 112 also includes a split-ring spring clip 150 retained within the circumferential groove 146 of the cavity 142. The spring clip 150 has an outer diameter D2 and an inner diameter D3. In a relaxed state, the outer diameter D2 is larger then the diameter D1 of the cavity 142 such that insertion of the spring clip 150 into the cavity 142 requires compressing the spring clip 150. The spring clip 150 may then snap into place in the circumferential groove 146. The spring clip 150 is preferably made from circular spring steel wire having a radius R2 smaller then the radius RI of the circumferential groove 146. Preferably, the clearance between the spring clip 150 and the circumferential groove 146 due to the difference between R1 and R2 will allow the spring clip 150 to expand radially until its inner diameter D3 is substantially equal to the diameter D1 of the cavity 142. Alternatively, another suitable resilient member may be used in the cavity 142.

Referring specifically to FIGS. 6 and 7, the upper support assembly 112 also includes a support arm 154 including a first end 158 and a second end 162. The first end 158 includes an axially extending threaded bore 164 and is coupled to the handlebar assembly 34 by way of two cooperating C-shaped members 170. The C-shaped members 170 are pivotally coupled to each other at one end by a pin 174. The other ends of the members 170 include alignable through holes 178 such that the members 170 may be placed around the handlebar assembly 34 and a fastener 182 may be extended through both members 170 and threaded into the threaded bore 164 of the arm 154. Tightening the fastener 182 draws the C-shaped members together between the head of the fastener 182 and the end 158 of the arm 154 such that C-shaped members 170 are rigidly clamped to the handlebar assembly 34.

Figure 10:
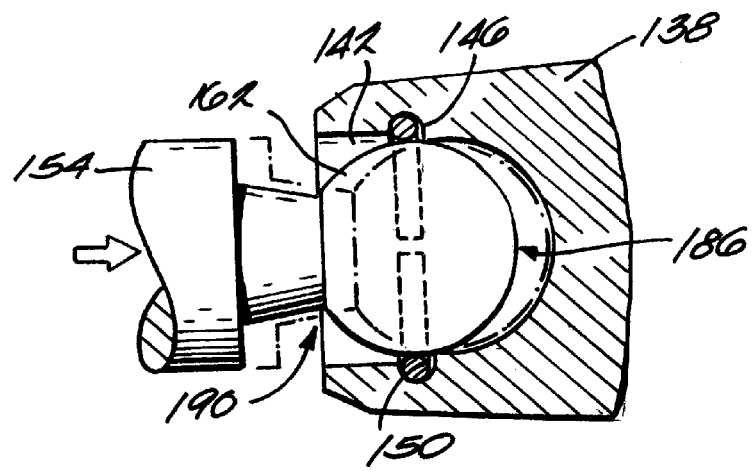
FIG. 10 is an enlarged view of the break away mechanism with the mounting arm partially inserted into the cavity.

Referring now to FIGS. 8–10, the second end 162 of the arm 154 is substantially frusto-spherical and includes a ball portion 186 and a recessed portion 190. The ball portion 186 includes a diameter D4 slightly smaller then the diameter D1 of the cavity 142 but larger then the relaxed inner diameter D3 of the spring clip 150. Insertion of the ball portion 186 into the cavity 142 results in the ball portion 186 first contacting the relaxed spring clip 150. Because the spring clip 150 has an inner diameter D3 smaller than the diameter D4 of the ball portion 186, additional force is required to insert the ball portion 186 further into the cavity 142. As additional force is applied, the spring clip 150 expands radially into the additional clearance previously discussed in the circumferential groove 146 allowing the ball portion 186 to continue moving further into the cavity 142. A point is reached (see FIG. 10) where the spring clip 150 is expanded to a maximum diameter such that the inner diameter D3 of the spring clip 150 is approximately equal to the outer diameter D4 of the ball portion 186. Further insertion of the ball portion 186 beyond this point results in contraction of the spring clip 150 (see FIG. 8) such that the spring clip 150 snaps around the recessed portion 190 of the arm 154, simultaneously drawing the ball portion 186 completely into the cavity 142. Once completely inserted into the cavity 142 (shown in FIGS. 7 and 8 and shown in phantom in FIG. 10), the frusto-spherical ball portion 186 snugly engages the frusto-spherical terminal end of the cavity 142. Thus, the windshield 90 is releasably coupled to the handlebar 166 of the motorcycle 10.

If sufficient force is applied to the windshield 90 from the handlebar assembly 34 area of the motorcycle 10, the ball portion 186 will be urged to withdraw from the cavity 142. In this event, the spring clip 150 will expand into the additional clearance of the circumferential groove 146, allowing the ball portion 186 to be fully extracted from the cavity 142. The windshield 90 will then freely pivot in a forward direction about the pivot pin 82.

One skilled in the art will quickly realize the advantages of the present invention. Split-ring spring clips 150 of the type used in the current invention are commercially available in, and are held to strict manufacturing standards for, a variety of sizes and stiffnesses. With the present invention, a designer may select the value of force required to allow the windshield 90 to "break away" simply by selecting a spring clip 150 with an appropriate stiffness. As used herein, the term "break away" refers to the ball portion 186 being released from the cavity 142 and the windshield 90 pivoting in a forward direction about the pivot pin 82. A stiffer spring clip 150 will result in a higher value of break-away force whereas a softer spring clip 150 will result in a lower break-away force. Also, the presence of a single pivot pin 82 eliminates the potential for binding due to misalignment of multiple pivot pins that must be collinear to function properly.

What is claimed is:

1. A motorcycle comprising:
    a frame including a steering tube;
    a triple tree including a steering column pivotally received within said steering tube;
    a pair of fork members extending down from said triple tree;
    a front wheel rotatably mounted between said fork members for rotation about an axis;
    a handlebar assembly mounted to said triple tree and actuable to pivot said triple tree, steering column, fork members, and front wheel with respect to said frame;
    a single lower windshield mounting member including a mounting portion and a pivot portion, said mounting portion being supported by said triple tree, said pivot portion supporting a single pivot pin;
    a windshield pivotally mounted to said pivot pin; and
    a break-away mechanism releasably coupling said windshield to said handlebar assembly, wherein in response to a predetermined force being applied to said windshield, said break-away mechanism permits said windshield to pivot about said pivot pin.

2. The motorcycle of claim 1, wherein said mounting member is generally V-shaped.

3. The motorcycle of claim 1, wherein said mounting member is directly mounted to said triple tree.

4. The motorcycle of claim 1, wherein said break-away mechanism includes at least one boss mounted to said windshield, and an arm having a first end fixed to said handlebar assembly and a second end releasably coupled to said boss.

5. The motorcycle of claim 4, wherein one of said boss and said second end includes a socket portion, and the other of said boss and said second end includes a ball portion, and wherein said socket portion includes a resilient member releasably securing said ball portion within said socket portion.

6. The motorcycle of claim 5, wherein said resilient member is a split-ring spring clip.

7. The motorcycle of claim 4, further comprising a clamping assembly clamping said first end of said arm to said handlebar assembly.

8. The motorcycle of claim 1, wherein said pivot pin is substantially parallel to said axis of rotation of said front wheel.

9. The motorcycle of claim 1, further comprising a lower windshield boss pivotally coupled to said pivot pin, wherein said windshield is resiliently coupled to said lower windshield boss.

10. The motorcycle of claim 1, wherein said pivot portion includes a pivot boss mounted to said mounting member, said pivot boss supporting said single pivot pin.

11. A windshield assembly for use on a motorcycle having handlebars and a triple tree, said windshield assembly comprising:
a single lower windshield mounting member including a mounting portion and a pivot portion, said mounting portion being supported by the triple tree and said pivot portion supporting a single pivot pin;
a windshield pivotally mounted to said pivot pin; and
a break-away mechanism releasably coupling said windshield to the handlebars of the motorcycle, wherein in response to a predetermined force being applied to said windshield, said break-away mechanism permits said windshield to pivot about said pivot pin.

12. The windshield assembly of claim 11, wherein said mounting member is generally V-shaped.

13. The windshield assembly of claim 11, wherein said mounting member is adapted to be directly mounted to the triple tree.

14. The windshield assembly of claim 11, wherein said break-away mechanism includes at least one boss mounted to said windshield and an arm having a first end adapted to be fixed to the handlebars and a second end releasably coupled to said boss.

15. The windshield assembly of claim 14, wherein one of said boss and said second end includes a socket portion, and the other of said boss and said second end includes a ball portion, and wherein, said socket portion includes a resilient member releasably securing said ball portion within said socket portion.

16. The windshield assembly of claim 15, wherein said resilient member is a split-ring spring clip.

17. The windshield assembly of claim 14, further comprising a clamping assembly adapted to clamp said first end of said arm to the handlebar.

18. The windshield assembly of claim 11, further comprising a lower windshield boss pivotally coupled to said pivot pin, wherein said windshield is resiliently coupled to said lower windshield boss.

19. The windshield assembly of claim 11, wherein said pivot portion includes a pivot boss fixed to said mounting member, said pivot boss supporting said single pivot pin.

20. A windshield assembly for use on a motorcycle having handlebars and a triple tree, said windshield assembly comprising:
a windshield having a through hole;
a grommet in said through hole;
a lower windshield boss within said through hole and surrounded by said grommet;
a generally V-shaped lower windshield mounting member including a mounting portion and a pivot portion, said mounting portion being supported by the triple tree;
a pivot boss mounted to said pivot portion and supporting a single pivot pin, said pivot pin pivotally received in said lower windshield boss; and
a break-away mechanism including an upper boss mounted to said windshield, and an arm having a first end fixed to the handlebars and a second end releasably coupled to said upper boss, wherein in response to a predetermined force being applied to said windshield, said second end detaches from said upper boss thereby permitting said windshield to pivot about said single pivot pin.

21. A motorcycle comprising:
a frame;
a triple tree pivotally coupled to the frame;
fork tubes coupled to the triple tree;
a front wheel rotatably coupled to the fork tubes;
a handlebar assembly connected to the triple tree and movable to pivot the triple tree, fork tubes, and front wheel with respect to the frame;
a windshield mounting member supported by and directly mounted to the triple tree; and
a windshield mounting member supported by and directly mounted to the triple tree; and
a windshield mounted to the windshield mounting member.

22. The motorcycle of claim 21, further comprising a break-away mechanism releasably coupling the windshield to the handlebar assembly, wherein the break-away mechansim permits the windshield to pivot about the windshield mounting member after a predetermined force is applied to the windshield.

23. The motorcycle of claim 22, wherein the break-away mechanism includes at least one upper windshield boss mounted to the windshield, and an arm having a first end fixed to the handlebar assembly and a second end releasably coupled to the boss.

24. The motorcycle of claim 23, wherein one of the boss and the second end includes a socket portion, and the other of the boss and the second end includes a ball portion, and wherein the socket portion includes a resilient member releasably securing the ball portion within the socket portion.

25. The motorcycle of claim 24, wherein the resilient member is a split-ring spring clip.

26. The motorcycle of claim 23, further comprising a clamping assembly clamping the first end of the arm to the handlebar assembly.

27. The motorcycle of claim 21, wherein the windshield is pivotally mounted to the windshield mounting member.

28. The motorcycle of claim 21, wherein the motorcycle includes only one windshield mounting member supported by the triple tree.

29. The motorcycle of claim 21, wherein the windshield mounting member is generally V-shaped.

30. The motorcycle of claim 21, wherein the front wheel is rotable about an axis, wherein the windshield mounting member includes a pivot pin, and wherein the pivot pin is substantially parallel to the axis of rotation of the front wheel.

31. The motorcycle of claim 30, further comprising a lower windshield boss pivotally coupled to the pivot pin, wherein the windshield is resiliently coupled to the lower windshield boss.

32. The motorcycle of claim 30, wherein the windshield mounting member includes a pivot portion and a mounting portion, and the pivot portion includes a pivot boss mounted to the mounting portion, the pivot boss supporting the pivot pin.

33. A motorcycle comprising:
    a frame;
    a triple tree pivotally coupled to the frame;
    fork tubes coupled to the triple tree;
    a front wheel rotatably coupled to the fork tubes;
    a handlebar assembly connected to the triple tree and movable to pivot the triple tree, fork tubes, and front wheel with respect to the frame;
    a windshield mounting member supported by the triple tree; and
    a windshield mounted to the windshield mounting member,
    wherein the front wheel is rotatable about an axis, wherein the windshield mounting member includes a pivot pin, and wherein the pivot pin is substantially parallel to the axis of rotation of the front wheel.

34. A windshield assembly for use on a motorcycle having handlebars and a triple tree, the windshield assembly comprising:
    a windshield mounting member supportable by and adapted to be directly mounted to the triple tree; and
    a windshield mounted to the windshield mounting member.

35. The windshield assembly of claim 34, wherein the windshield mounting member includes a pivot pin, the windshield assembly further comprising a break-away mechanism adapted to releasably couple the windshield to the handlebars of the motorcycle, wherein in response to a predetermined force being applied to the windshield, the break-away mechanism permits the windshield to pivot about the pivot pin.

36. The windshield assembly of claim 35, wherein the break-away mechanism includes at least one boss mountable to the windshield and an arm having a first end adaptable to be fixed to the handlebars and a second end releasably coupled to the boss.

37. The windshield assembly of claim 36, wherein one of the boss and second end includes a socket portion, and the other of the boss and the second end includes a ball portion, and wherein, the socket portion includes a resilient member releasably securing the ball portion within the socket portion.

38. The windshield assembly of claim 37, wherein the resilient member is a split-ring spring clip.

39. The windshield assembly of claim 36, further comprising a clamping assembly adapted to clamp the first end of the arm to the handlebar.

40. The windshield assembly of claim 34, wherein the windshield assembly includes only one windshield mounting member supportable by the triple tree.

41. The windshield assembly of claim 34, wherein the windshield mounting member includes a pivot pin, a mounting portion, and a pivot portion, and wherein the pivot portion supports the pivot pin.

42. The windshield assembly of claim 41, wherein the pivot portion includes a pivot boss fixed to the windshield mounting member, the pivot boss supporting the pivot pin.

43. The windshield assembly of claim 34, wherein the windshield mounting member is generally V-shaped.

44. The windshield assembly of claim 34, wherein the windshield mounting member includes a pivot pin, the windshield assembly further comprising a lower windshield boss pivotally coupled to the pivot pin, wherein the windshield is resiliently coupled to the lower windshield boss.

45. A method of mounting a windshield to a motorcycle having a handlebar assembly mounted to a triple tree, the method comprising:
    attaching a mounting member directly to the triple tree; and
    connecting a lower portion of the windshield to the mounting member.

46. The method of claim 45 further comprising attaching a break-away mechanism to the handlebar assembly and connecting the upper portion of the windshield to the break-away mechanism.

47. The method of claim 46, further comprising applying a predetermined force to the upper portion of the windshield, releasing the windshield from the break-away mechanism, and pivoting the windshield about the mounting member.

* * * * *